April 21, 1931.  W. A. CALDWELL  1,801,721
TABLE TOP FOR PORTABLE SAWS
Filed July 25, 1929  2 Sheets-Sheet 1
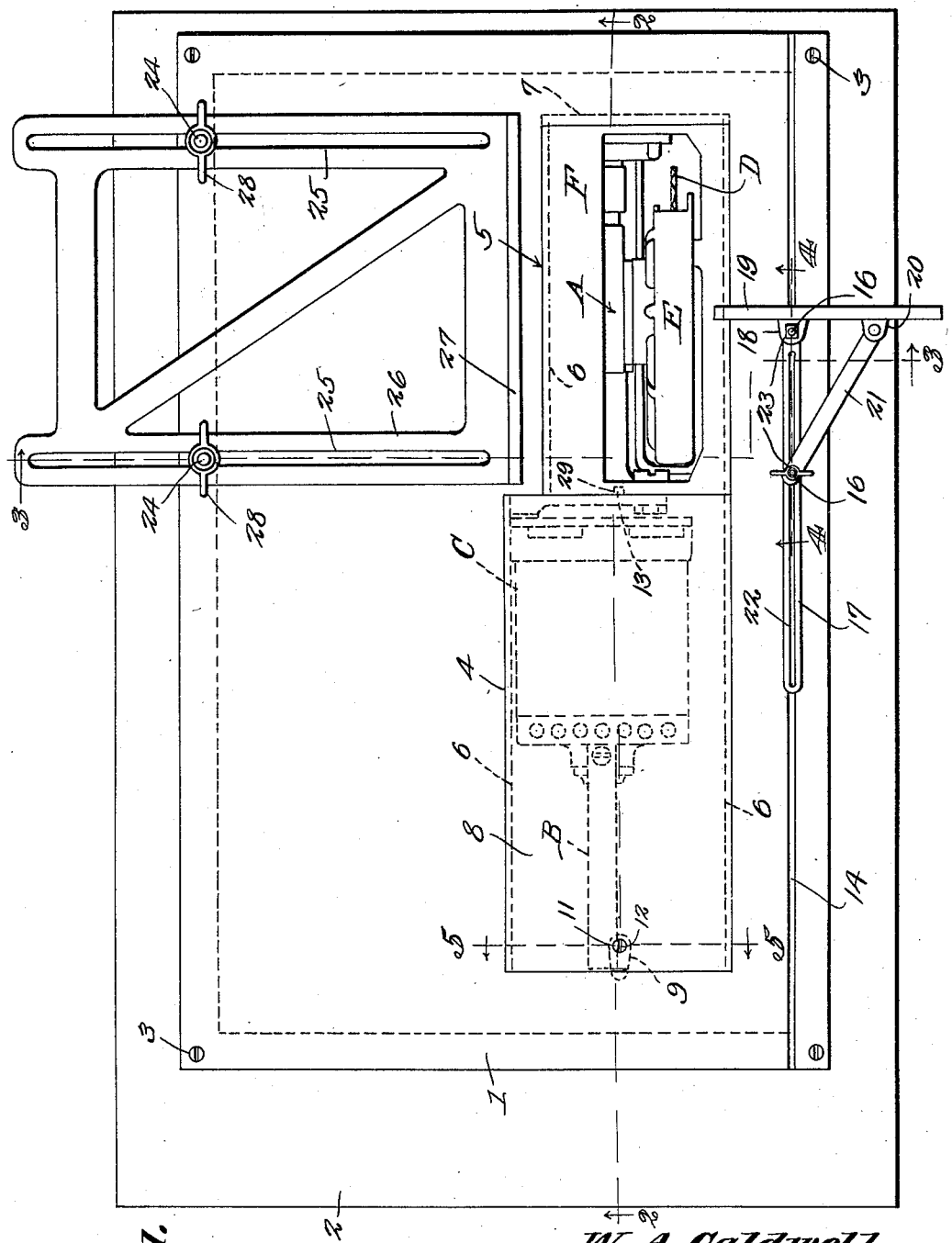

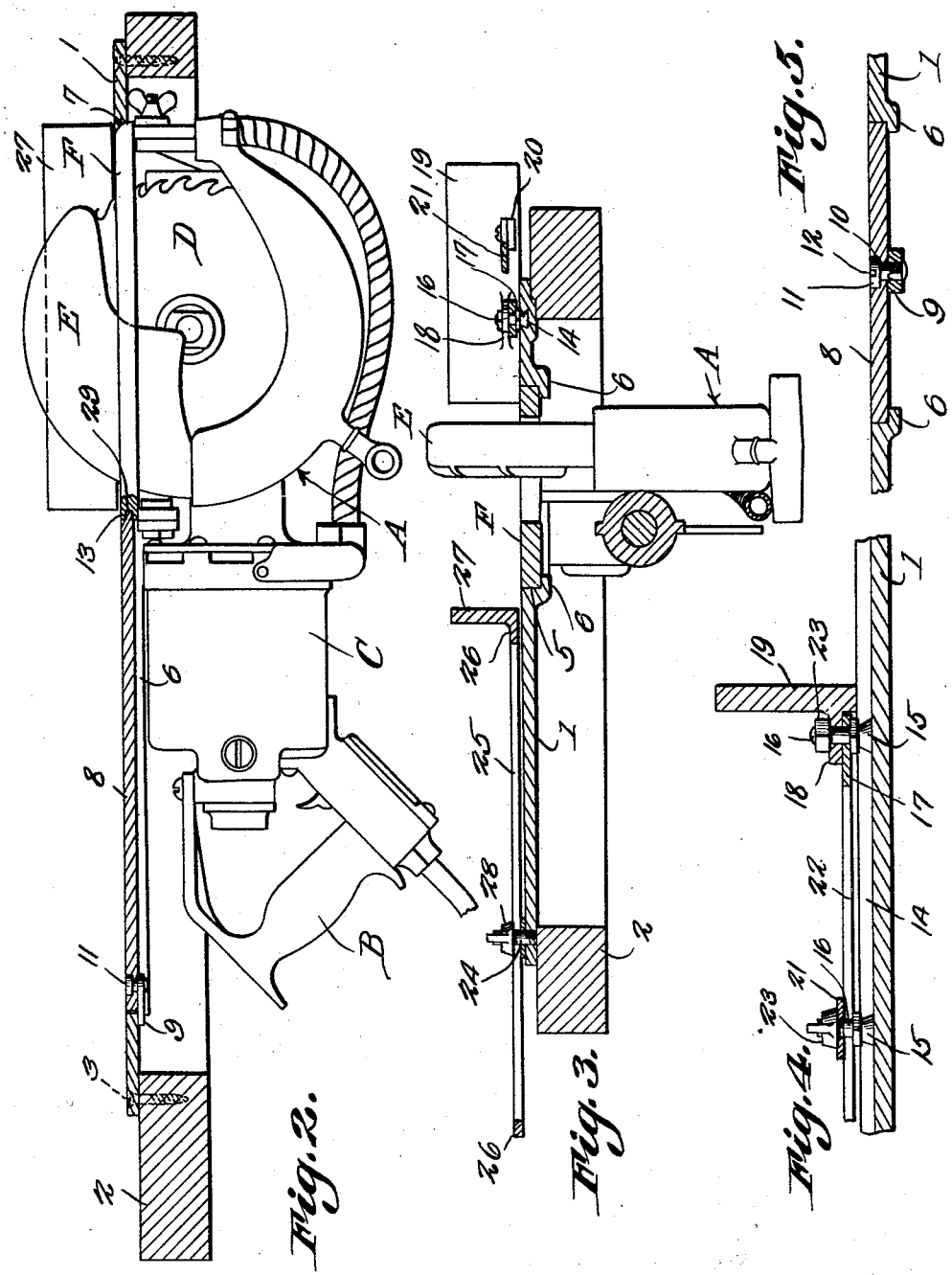

Patented Apr. 21, 1931

1,801,721

UNITED STATES PATENT OFFICE

WELSEY A. CALDWELL, OF CHAMPAIGN, ILLINOIS

TABLE TOP FOR PORTABLE SAWS

Application filed July 25, 1929. Serial No. 380,953.

This invention relates to a table top by means of which portable electrically driven hand saws can be used in the same way as ordinary circular saws.

Portable electrically driven hand saws are used extensively for cutting lumber used in construction work but, because of their weight and size, the uses to which they can be put are limited.

It is an object of the present invention to provide a table top in which a portable electrically driven hand saw can be mounted for the purpose of sawing small pieces of lumber that could not be cut properly with the saw if manipulated in the prescribed manner.

It is also an object of the invention to so mount the saw in the table top provided therefor as to allow it to be removed readily should it be desired to use the saw in the way originally intended.

A further object is to combine with the table top an arrangement of adjustable gages by means of which the lumber can be held in proper position during the cutting operation.

A still further object is to provide a table top which is cheap to manufacture and can be sold at low cost.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a top plan view of the table top applied to a supporting structure and having a portable electrically driven hand saw connected thereto.

Figure 2 is a section on line 2—2, Figure 1.

Figure 3 is a section on line 3—3, Figure 1.

Figure 4 is an enlarged section on line 4—4, Figure 1.

Figurt 5 is an enlarged section on line 5—5, Figure 1.

Referring to the figures by characters of reference, A designates a portable electrically driven hand saw of any make. In the present instance the handle portion or grip of the saw has been indicated at B, the motor housing at C and the saw disk at D. This disk has a pivoted guard E. The base of the saw has been designated at F.

As is well known to those skilled in the art a saw such as shown and described is manipulated by placing the base F on the work to be cut and sliding it along the line where the cut is to be made. During this operation, the pivoted guard E will swing out of the way. While saws will operate efficiently when used in this manner for cutting large pieces of lumber, smaller pieces such as stone wedges, small blocks, etc., cannot ordinarily be produced satisfactorily.

In order to adapt a portable electrically driven hand saw for a wider variety of uses the present invention has been devised. This includes a plate 1 constituting the body portion of the table top and adapted to be secured at its corners or other points to a supporting structure 2 by means of screws or the like shown at 3. This plate has an opening 4 one end portion of which is preferably narrower than the remainder of the opening so as to be substantially equal to the width of the base F. This reduced portion of the opening has been indicated at 5.

Supporting ribs 6 are formed with the plate 1 and extend along the longitudinal walls of the opening 4—5 so as to provide ledges. The end wall of the reduced portion 5 of the opening is undercut as shown at 7 whereby a retaining lip is provided.

A closure plate 8 is adapted to be seated in the opening 4 so as to fill all portions thereof except the reduced portion 5. This plate 8 rests on the ribs 6 and has its top face flush with the corresponding face of the top 1. A button 9 is connected to the bottom of one end portion of closure plate 8 and has a rotatable pin 10 secured to it and formed with a head 11 provided with a kerf 12. The construction of these parts is such that by placing one end of a screw driver in the kerf 12 and rotating pin 10 button 9 can be moved into or out of position beneath the adjacent portion of plate 1. A lug 13 can be extended from that end of closure plate 8 remote from the button.

Formed between and parallel with the opening 4 and one edge of plate 1 is a dovetailed groove 14 extending from one end to the other of plate 1 and constituting a guideway for the tapered heads 15 of upstanding bolts 16. These bolts are extended through a longitudinally slotted arm 17 and one of the bolts constitutes a means for pivotally connecting the said arm to an ear 18 extending from a gage 19. Another ear 20 is extended from this gage and is connected by a link 21 to the other bolt 16 which extends through the slot 22 in arm 17. Thus it will be seen that by loosening nuts 23 on bolts 16 the gage 19 can be adjusted angularly to any desired position relative to the saw blade D after which, by tightening the nuts, said gage will be securely held.

Additional bolts 24 can be extended upwardly from plate 1 between opening 4—5 and that edge of the plate remote from gage 19. These bolts are extended through parallel slots 25 formed in an adjustable plate 26 constituting part of a gage 27. Nuts 28 are mounted on bolts 24 and when they are loosened the gage 27 can be adjusted toward or from the saw blade D. By tightening the nuts the gage can be held securely against displacement.

In practice the plate 1 is attached to a supporting structure so as to bridge an opening in said structure larger than the opening 4—5 so that the opening in plate 1 will not be obstructed. The closure plate 8 is removed from plate 1. A small recess 29 is drilled into one end of the base F of the hand saw after which said hand saw is inverted and lowered through the opening 4—5. The edges of base F will ultimately rest on the ribs 6 and by thrusting the base longitudinally one end thereof will be brought to position under the overhanging lip at 7. Thus base F will completely fill the reduced portion 5 of opening 4 and the inverted saw blade D with its shiftable guard E will extend above the top surface of the plate 1. Thereafter the closure plate 8 is inserted into the opening 4 and shifted longitudinally to cause lug 13 to enter recess 29. The plate will then rest on ribs 6 where it can be secured by turning button 9 into engagement with plate 1. With the parts thus positioned there will be no projecting portions above the level of the top of plate 1 other than the saw blade and its guard. This does not apply of course to the gages that obviously extend upwardly to hold the work in proper position during the sawing operation.

What is claimed is:

1. The combination with a portable motor-driven hand saw including a circular saw, a slotted plate through which the saw extends, and a motor operatively connected to the saw and projecting beyond the plate, of a plate for attachment to a supporting structure, said plate having an opening therein, a portion of which is of sufficient size to permit the downward insertion of the motor portion of the saw when inverted, the remaining portion of the opening being proportioned to receive and support the inverted base of the saw with its upper surface flush with the plate, a closure plate adapted to be supported by the walls of the enlarged portion of the opening and to lie flush with the apertured plate, means on the closure plate for co-operation with one end of the base plate to hold the closure plate in position, and means beneath the closure plate for engaging the apertured plate to fasten the other end of said closure plate in position within the opening.

2. The combination with an electric portable hand saw including a slotted base, a saw projecting through the base, and a motor operatively connected to the saw and projecting beyond one end of the plate, of a mounting for supporting the saw in an inverted position, including a plate for attachment to a supporting structure, said plate having an opening therein, one end of which is proportioned to receive the motor of the saw when inverted and inserted downwardly into the opening, the other end portion of the opening being proportioned to receive and support the base of the inverted saw, a cover plate insertable into the enlarged portion of the opening for overlying the motor, and means carried by the said cover plate and co-operating with the base plate of the saw and with one end wall of the opening respectively for holding the cover plate in the opening and flush with the mounting.

In testimony that I claim the foregoing as my own, I have hereto affixed my signature.

WELSEY A. CALDWELL.